(12) United States Patent  
Ording

(10) Patent No.: US 9,037,997 B2  
(45) Date of Patent: May 19, 2015

(54) USER INTERFACE PRESENTATION OF INFORMATION IN RECONFIGURED OR OVERLAPPING CONTAINERS

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 12/754,120

(22) Filed: Apr. 5, 2010

(65) Prior Publication Data

US 2010/0287494 A1    Nov. 11, 2010

Related U.S. Application Data

(63) Continuation of application No. 10/835,458, filed on Apr. 30, 2004, now Pat. No. 7,694,233.

(51) Int. Cl.
*G06F 3/0481* (2013.01)
*G06F 3/0484* (2013.01)

(52) U.S. Cl.
CPC ............ *G06F 3/0481* (2013.01); *G06F 3/0484* (2013.01)

(58) Field of Classification Search
USPC ......................................................... 715/790
See application file for complete search history.

(56) References Cited

U.S. PATENT DOCUMENTS

| 5,371,847 | A | * | 12/1994 | Hargrove ..................... 715/788 |
| 5,390,295 | A | * | 2/1995 | Bates et al. ................... 715/789 |
| 5,497,454 | A | * | 3/1996 | Bates et al. ................... 715/799 |
| 5,577,187 | A | * | 11/1996 | Mariani ........................ 715/792 |
| 5,644,737 | A | * | 7/1997 | Tuniman et al. ............. 715/810 |
| 5,657,463 | A | | 8/1997 | Bingham |
| 5,714,971 | A | * | 2/1998 | Shalit et al. ................... 715/804 |
| 5,737,558 | A | | 4/1998 | Knight et al. |
| 5,754,809 | A | * | 5/1998 | Gandre ......................... 715/782 |
| 5,796,402 | A | * | 8/1998 | Ellison-Taylor ............. 715/792 |
| 5,819,055 | A | * | 10/1998 | MacLean et al. ............ 715/798 |
| 5,828,360 | A | * | 10/1998 | Anderson et al. ............ 715/834 |
| 5,841,435 | A | * | 11/1998 | Dauerer et al. ............... 715/775 |
| 5,874,962 | A | * | 2/1999 | de Judicibus et al. ........ 715/789 |
| 5,920,315 | A | * | 7/1999 | Santos-Gomez ............. 715/792 |
| 5,929,854 | A | * | 7/1999 | Ross ............................. 715/783 |
| 5,959,626 | A | | 9/1999 | Garrison et al. |

(Continued)

OTHER PUBLICATIONS

Shebanek. et al. "NextStep" 1993.*

(Continued)

*Primary Examiner* — Steven B Theriault
(74) *Attorney, Agent, or Firm* — Schwegman Lundberg & Woessner, P.A.

(57) ABSTRACT

A graphical user interface provides a display of multiple items of information in a manner such that the user can comprehend the relationship of various items to one another over a wide span. To achieve this result, at least some information containers are allocated a reduced amount of area in which to be viewed by the user. At least one container continues to be displayed in full view, however. In one embodiment, the containers are displayed in an overlapping arrangement. In a column view, for instance, the column containing the object that was last clicked upon, and the column showing the contents of the selected object, can be displayed in full view. The other columns may be only partially visible, due to the overlapping arrangement. However, the user is presented with enough information to comprehend the relationship of objects at different levels. When the user moves a cursor over a container with a reduced viewing area, the display changes to show that container in full view.

36 Claims, 13 Drawing Sheets

(56) References Cited

U.S. PATENT DOCUMENTS

| | | | |
|---|---|---|---|
| 6,008,809 A * | 12/1999 | Brooks | 715/792 |
| 6,031,530 A * | 2/2000 | Trueblood | 715/791 |
| 6,072,488 A * | 6/2000 | McFarland | 715/799 |
| 6,141,007 A * | 10/2000 | Lebling et al. | 715/792 |
| 6,163,318 A * | 12/2000 | Fukuda et al. | 715/803 |
| 6,195,094 B1 * | 2/2001 | Celebiler | 715/764 |
| 6,236,400 B1 | 5/2001 | Guerrero | |
| 6,248,946 B1 * | 6/2001 | Dwek | 84/609 |
| 6,310,631 B1 | 10/2001 | Cecco et al. | |
| 6,310,633 B1 * | 10/2001 | Graham | 715/839 |
| 6,396,520 B1 | 5/2002 | Ording | |
| 6,414,698 B1 * | 7/2002 | Lovell et al. | 715/800 |
| 6,590,594 B2 * | 7/2003 | Bates et al. | 715/784 |
| 6,603,493 B1 * | 8/2003 | Lovell et al. | 715/800 |
| 6,691,282 B1 * | 2/2004 | Rochford et al. | 715/234 |
| 6,806,892 B1 * | 10/2004 | Plow et al. | 715/781 |
| 6,825,860 B1 * | 11/2004 | Hu et al. | 715/801 |
| 6,909,443 B1 * | 6/2005 | Robertson et al. | 715/782 |
| 6,919,890 B2 * | 7/2005 | Halstead, Jr. | 345/440 |
| 6,966,033 B1 * | 11/2005 | Gasser et al. | 715/738 |
| 7,062,453 B1 * | 6/2006 | Clarke | 705/26.3 |
| 7,080,326 B2 * | 7/2006 | Molander et al. | 715/788 |
| RE39,610 E * | 5/2007 | McFarland | 715/794 |
| 7,249,327 B2 * | 7/2007 | Nelson et al. | 715/782 |
| 7,263,663 B2 * | 8/2007 | Ballard et al. | 715/762 |
| 7,269,797 B1 * | 9/2007 | Bertocci et al. | 715/783 |
| 7,343,562 B2 * | 3/2008 | Bonura et al. | 715/768 |
| 7,362,341 B2 * | 4/2008 | McGuire et al. | 345/676 |
| 7,434,177 B1 * | 10/2008 | Ording et al. | 715/862 |
| 7,624,339 B1 * | 11/2009 | Engel et al. | 715/214 |
| 7,694,233 B1 * | 4/2010 | Ording | 715/790 |
| 7,735,018 B2 * | 6/2010 | Bakhash | 715/782 |
| 7,747,965 B2 * | 6/2010 | Holecek et al. | 715/781 |
| 7,818,691 B2 * | 10/2010 | Irvine | 715/856 |
| 7,823,080 B2 * | 10/2010 | Miyajima et al. | 715/792 |
| 7,921,376 B2 * | 4/2011 | Robertson et al. | 715/782 |
| 8,001,487 B2 * | 8/2011 | Koppert | 715/830 |
| 8,103,963 B2 * | 1/2012 | Ikeda et al. | 715/764 |
| 8,316,320 B2 * | 11/2012 | Relyea et al. | 715/817 |
| 2001/0043238 A1 * | 11/2001 | Guerrero | 345/853 |
| 2003/0142138 A1 * | 7/2003 | Brown et al. | 345/797 |
| 2003/0179237 A1 * | 9/2003 | Nelson et al. | 345/765 |
| 2004/0133526 A1 | 7/2004 | Shmueli et al. | |
| 2004/0255254 A1 * | 12/2004 | Weingart et al. | 715/804 |
| 2004/0261038 A1 * | 12/2004 | Ording et al. | 715/792 |
| 2004/0268451 A1 * | 12/2004 | Robbin et al. | 999/999.999 |
| 2005/0071780 A1 * | 3/2005 | Muller et al. | 715/825 |
| 2005/0235220 A1 * | 10/2005 | Duperrouzel et al. | 715/788 |
| 2005/0262450 A1 * | 11/2005 | Sauermann | 715/784 |
| 2007/0118811 A1 * | 5/2007 | Tsuchimura et al. | 715/792 |
| 2008/0184171 A1 * | 7/2008 | Sato et al. | 715/841 |
| 2011/0093819 A1 * | 4/2011 | Irvine | 715/856 |

OTHER PUBLICATIONS

Next Software Inc. "Ergosoft WinBrowser 3.0" Aug. 12, 2003.*
IBM TDB article ("Window Closing Animations": IBM Technical Disclosure Bulletin, US, IBM Corp, NY; Nov. 1, 1995; ISSN 0018 8689).
Robin William, Mac OS X Book, Jaguar Edition, Dec. 26, 2002, Chapter 6 sec. 3 and 14, pp. 1-4, from URL: http://proquest.safaribooksonline.com/0321169662/ch06lev1sec14 and http://proquest.safaribooksonline.com/0321169662/ch10lev1sec3.

* cited by examiner

| Name | Parent | Date M | Kind |
|---|---|---|---|
| Adobe Photoshop file | | | |
| browse by date5 + actions | Finder | 12/12 | Adobe Photoshop file |
| browse by date5 + actions2 | Finder | 12/12 | Adobe Photoshop file |
| browse by date5 + info | Finder | 12/15 | Adobe Photoshop file |
| browse by date5 + info2 | Finder | 12/15 | Adobe Photoshop file |
| browse by date5 header | Finder | 12/10 | Adobe Photoshop file |
| browse by date5 header2 | Finder | 12/10 | Adobe Photoshop file |
| browse by date5 header3 | Finder | 12/10 | Adobe Photoshop file |
| browse by date5 header4 | Finder | 12/10 | Adobe Photoshop file |
| browse by date5 header5 | Finder | 12/11 | Adobe Photoshop file |
| browse by date5 | Finder | 12/10 | Adobe Photoshop file |
| browse by day | Finder | 12/9 | Adobe Photoshop file |
| browse by day2 | Finder | 12/9 | Adobe Photoshop file |
| browse by day3 | Finder | 12/10 | Adobe Photoshop file |
| browse by day4 | Finder | 12/10 | Adobe Photoshop file |
| browse by folder + info | Finder | 12/15 | Adobe Photoshop file |
| browse by keyword map + S8 | Finder | 1/9/0 | Adobe Photoshop file |
| browse by keyword map + S82 | Finder | 1/12/ | Adobe Photoshop file |
| browse by keyword map | Finder | 12/17 | Adobe Photoshop file |
| Adobe Photoshop TIFF file | | | |
| browse by date5 header5 copy | assets | 2/2/0 | Adobe Photoshop TIFF file |
| Folder | | | |
| FindBrowse | Finder | 2/11/ | Folder |
| findBrowse assets | FindBr | 2/2/0 | Folder |
| findBrowse sequ assets | FindBr | 2/2/0 | Folder |
| Macromedia Director Movie | | | |
| find browse multi 1 | FindBr | 2/2/0 | Macromedia Director Movie |
| find browse multi 2 | FindBr | 2/2/0 | Macromedia Director Movie |
| find browse multi 3 | FindBr | 2/4/0 | Macromedia Director Movie |
| findBrowse sequence | FindBr | 2/2/0 | Macromedia Director Movie |
| findBrowse sequence2 | FindBr | 2/4/0 | Macromedia Director Movie |
| FindBrowse | Find Se | 2/2/0 | Macromedia Director Movie |

*Fig. 7*

USER INTERFACE PRESENTATION OF INFORMATION IN RECONFIGURED OR OVERLAPPING CONTAINERS

CROSS REFERENCE TO RELATED APPLICATION

This application is a continuation of application Ser. No. 10/835,458, filed Apr. 30, 2004, now U.S. Pat. No. 7,694,233.

FIELD OF THE INVENTION

The present invention is directed to graphical user interfaces for computers, and more particularly to the simultaneous display of multiple items of information in a manner that facilitates user comprehension and navigation among the items of information.

BACKGROUND OF THE INVENTION

During typical use of a computer, such as a personal computer, a variety of situations arise in which multiple items of information are presented to the user. For instance, the user may have several applications open, and each application typically has one or more containers to display content associated with the application. In many graphical user interfaces, such containers take the form of windows. The various items of information, i.e. the content of the respective windows, may be unrelated to one another. In other situations, the various items of information may have a structured relationship to one another. An example of this latter situation is a display of the contents of the computer's file system.

A computer's file system is responsible for managing the reading and writing of data on storage devices that are mounted on the computer, for example internal disk drives, network storage devices, and the like. In the case of personal computers and workstations, a graphical user interface might be used to view the structure of the file system, e.g. the hierarchy of objects such as directories, folders and files stored therein. Typically, the graphical user interface provides a plurality of alternative ways in which to view the contents of the file system. For example, one approach may comprise a hierarchical view, in which the nested relationship of files and folders to one another is displayed in the form of a tree structure. A browser can be associated with this type of view, in which the hierarchical view of folders and files is displayed in one pane of the browser window. When the user selects a folder in that pane, the contents of that folder are displayed in another pane of the window. Each pane represents a separate container of information.

In another approach, sometimes identified as an icon view, the files and folders at a particular level of the file system structure are displayed as individual icons within a window. If the user clicks upon a folder within that window, the contents of that folder are displayed. Depending on user preferences, the new information pertaining to the contents of the folder might replace the previous information within the existing window, or a new window might be displayed in an overlapping manner on top of the existing window.

A column view offers another approach for displaying the contents of a file system. An example of the column view is illustrated in FIGS. 1a-1f. FIG. 1a illustrates a window having columns, or panes, that constitute containers corresponding to respective levels of the file system. In the example of FIG. 1a, the left and middle columns display the objects at the two highest levels of the file system, respectively. The left column 10 identifies the available storage resources for the computer, in this case an internal hard disk drive 12, a removable compact disk 14, and a network 16. In this example, the user has clicked on the icon for the hard disk drive 12, and consequently the files and folders at the highest level of this storage medium are displayed in the middle column 18. Since the list of folders and files to be displayed in this column exceeds the height of the window, a vertical scroll bar 19 is displayed adjacent the column, to permit the user to view all of the objects on the hard disk drive.

If the user clicks on one of the folders in the second column 18, the display changes to that illustrated in FIG. 1b. In this view, a third column 20 on the right side of the window illustrates the contents of the folder that was selected, in this case the folder labeled "Documents."

If the user clicks on one of the folders in the third column 20, the display changes to that illustrated in FIG. 1c. In this view, all of the prior columns have shifted to the left, and a fourth column 24 illustrates the contents of the folder on which the user clicked, in this case the folder labeled "Web Pages." In this view, the first column 10 is no longer visible. If the user desires to view the first column, it is necessary to select a horizontal scroll bar 22 and move it to the left, so that the contents of the window shift to the right, which will result in the view of FIG. 1b.

In a similar manner, if the user clicks on a folder in the fourth column 24, the display changes to that illustrated in FIG. 1d, in which a fifth column 26 that lists the contents of the selected file is displayed. FIG. 1e illustrates the results of clicking on a folder in the fifth column 26, which results in the display of a sixth column 28, that lists the contents of the "Graphics" folder in the fifth column. Finally, if the user clicks on one of the documents in the column 28, information about that document appears in another new column 29, as shown in FIG. 1f. It can be seen that, as each successive column is displayed, the scroll bar 22 becomes shorter, due to the fact that there are a greater number of columns over which the user can scroll the display.

It may be possible for the user to expand the size of the window, so that a greater number of columns might be viewed at once. However, there is a practical limit to the size of the window, and hence the number of columns that can be viewed simultaneously. As a result, if more than a few levels of the file system are to be accessed, not all of the columns can appear in the window together, and it becomes necessary for the user to scroll the displayed columns in order to view the contents of the various levels of the file system that are not adjacent one another.

As a result of the need to scroll the display in order to view separated columns, the user is unable to obtain an overview of the total path from the highest level in the file system to a folder or file of interest. Since the user is only presented with a view that is limited to a few adjacent levels of the file system at any one time, it is difficult to obtain the full context of the file system. For example, when viewing the fifth, sixth and seventh columns illustrated in FIG. 1f, the user may not remember whether he is looking at files stored on the hard drive or those stored on a removable disk.

The foregoing problem is not limited to file system viewers. In general, it can arise in the context of any set of information in which the various items of information have a structured relationship to one another, such as a hierarchical relationship, and it is desirable to view such relationship over an appreciable range of items. For instance, it can occur in an application which displays program code objects in the form of a hierarchy.

SUMMARY OF THE INVENTION

In accordance with one feature of the present invention, the graphical user interface provides a display of multiple containers of information in a manner such that the user can comprehend the relationship of various items in the containers to one another over a wide span. To achieve this result, at least some of the containers are allocated a reduced amount of area in which to be viewed by the user. At least one container continues to be displayed in full view, however. In one embodiment, the containers are displayed in an overlapping arrangement. In a column view, for instance, the column containing the object that was last clicked upon, and the column showing the contents of the selected object, can be displayed in full view. The other columns may be only partially visible, due to the overlapping arrangement. However, the user is presented with enough information to comprehend the relationship of objects at different levels. As a result of this arrangement, the user is able to view the entire path leading from the highest level of the information structure to an object of interest without undue scrolling.

Techniques other than overlap can be used to display containers with a reduced viewing area. For instance, rather than obscuring some of the contents of a container by overlapping, it may be preferable to scale the container in one or both dimensions, so that the entire contents of the container remain visible in the reduced area, albeit in compressed form. As another example, an animation can be applied to the containers so that they appear to rotate out of the plane of the display and become stacked closer together.

As another feature of the invention, when the user moves a cursor over a container with a reduced viewing area, or otherwise directs attention to such a container, the other containers move on the display to show that container in full view. This feature of the invention can be applied to any type of information containers that are displayed in a reduced area. For example, in addition to overlapping columns, it can be utilized in conjunction with windows that have an overlapping arrangement on a display. By simply navigating around the display area, for example by moving a cursor, the user can be presented with a full view of the contents of any given container.

Further features of the invention, and the advantages achieved thereby, are described hereinafter with reference to exemplary embodiments illustrated in the accompanying figures.

BRIEF DESCRIPTION OF THE DRAWINGS

FIG. 7 is an illustration of the application of the present invention to a list view;

DETAILED DESCRIPTION

To facilitate an understanding of the present invention, it is described hereinafter with reference to its implementation in an operating system for personal computers. Further in this regard, examples of a graphical user interface are provided with reference to a file system column view in the Macintosh Operating System (Mac OS) developed by Apple Computer, Inc., to provide the reader with specific examples of the concepts which underlie the invention. It will be appreciated, however, that the invention is not limited to these illustrative examples. Rather, the principles upon which the invention is based can be applied to a variety of different types of computer operating systems, as will be apparent to those of skill in the art. Likewise, they are not limited to viewing of a file system, and can be used in the presentation of various types of information, as well as different forms of information containers.

Figure 2:
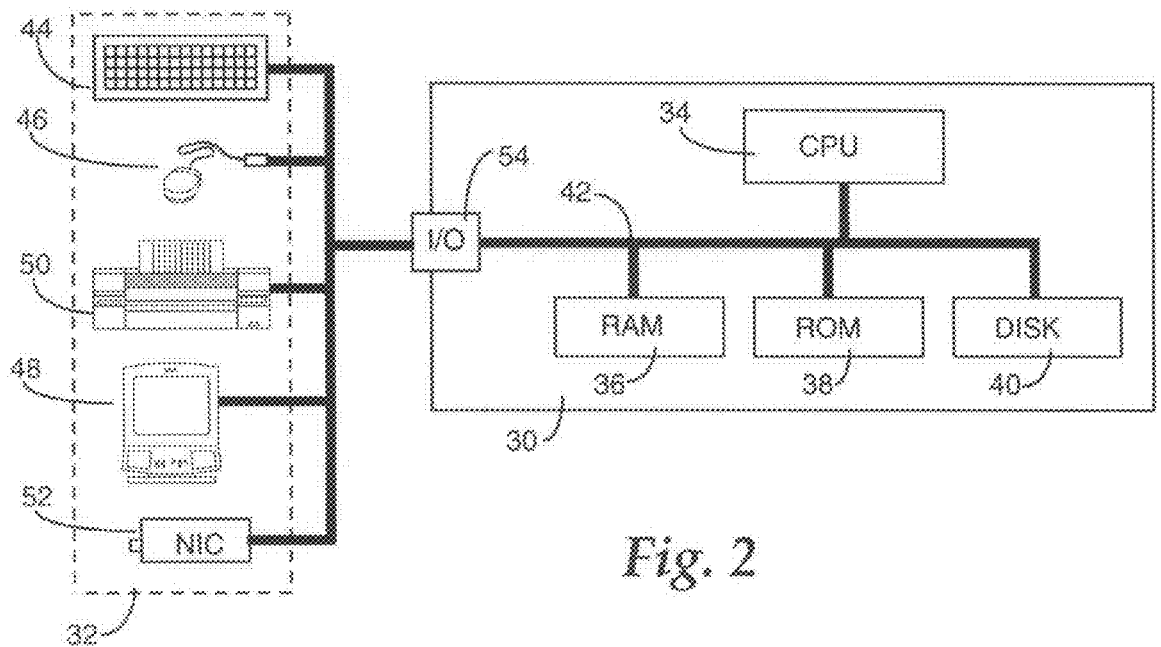
FIG. 2 is a general block diagram of an exemplary computer system in which the present invention can be implemented.

An exemplary computer system, of the type in which the present invention can be implemented, is illustrated in block diagram form in FIG. 2. The exemplary computer system includes a computer 30 having a variety of external peripheral devices 32 connected thereto. The computer 30 includes at least one central processing unit (CPU) 34 and associated memory. This memory generally includes a main memory which is typically implemented in the form of random access memory 36, a static memory that can comprise a read only memory 38, and a permanent storage device, such as a magnetic or optical disk 40. The CPU 34 communicates with each of these forms of memory through an internal bus 42. The peripheral devices 32 include a data entry device such as a keyboard 44, and a pointing or cursor control device 46, such as a mouse, trackball, pen or the like. One or more display devices 48, such as a CRT monitor or an LCD screen, provides a visual display of information, including the various components of a graphical user interface. Hard copies of desired information can be provided through a printer 50, or similar such device. A network connection 52 provides the computer with access to one or more servers, which may function as gateways, file storage systems, messaging systems, and the like. Each of these peripheral devices 32 communicates with the CPU 34 by means of one or more input/output ports 54 on the computer.

Figure 3:
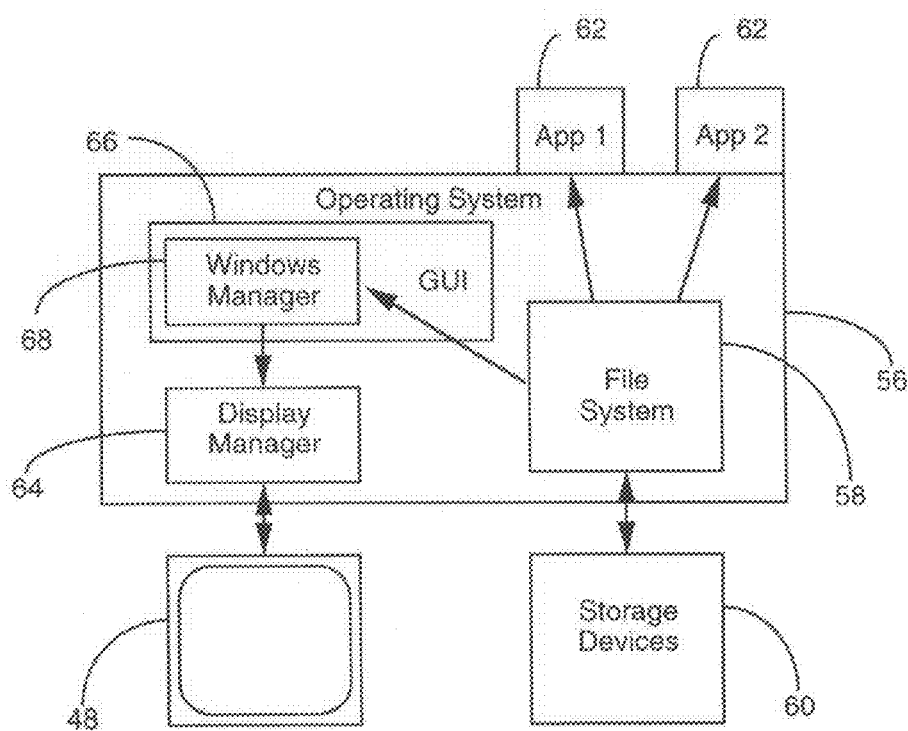
FIG. 3 is a block diagram of the architecture of some of the software and hardware components of the computer system.

The CPU 34 executes software programs that are retrieved from the permanent storage device 40 or remotely accessible storage devices, and loaded into its working memory 36. Components of the computer's operating system that are involved in the implementation of the present invention are depicted in the block diagram of FIG. 3. The computer's operating system 56 performs basic low-level functions and interacts with the hardware components of the computer system. As illustrated in FIG. 3, the operating system includes a file system 58 that is responsible for managing the reading and writing of data on storage devices 60 that are mounted on the computer system, such as the permanent memory 40 and/or remote file servers. For instance, the file system retrieves files and provides them to applications 62, and stores files created by the applications. Another component of the operating system 56 is a display manager 64, which controls the information that is presented to the monitor 48 for display to the user. The graphical user interface 66 is another component of the operating system that interacts with the display manager to present information on the display device 28. For example, the graphical user interface provides the display manager with data that describes the appearance and position of windows, icons, control elements and similar types of user interface objects. The graphical user interface might provide this information directly to the display manager 64, or via a windows manager 68.

Figure 1A:
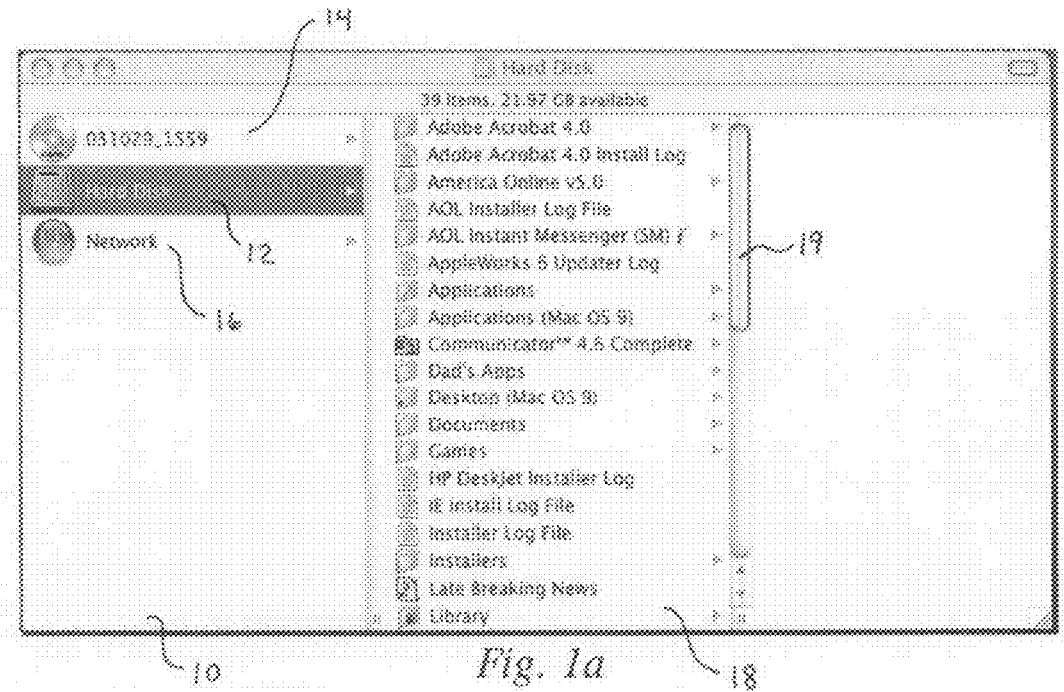
FIGS. 1a-1f illustrate successive screens in a conventional column view of a file system.
Figure 1B:
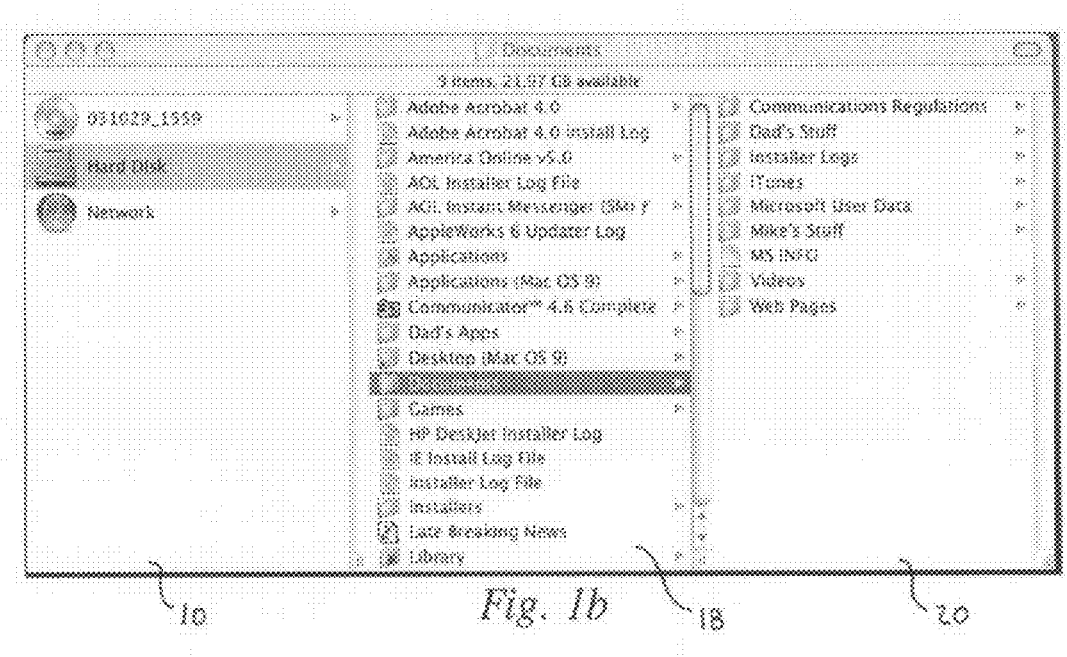
Figure 1C:
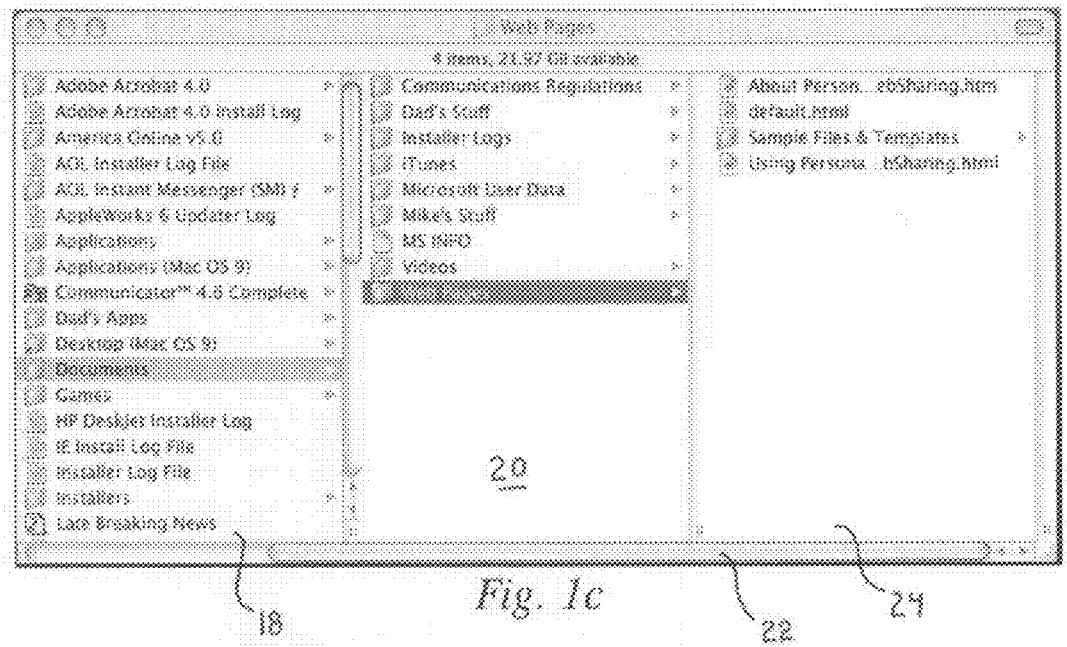
Figure 1D:
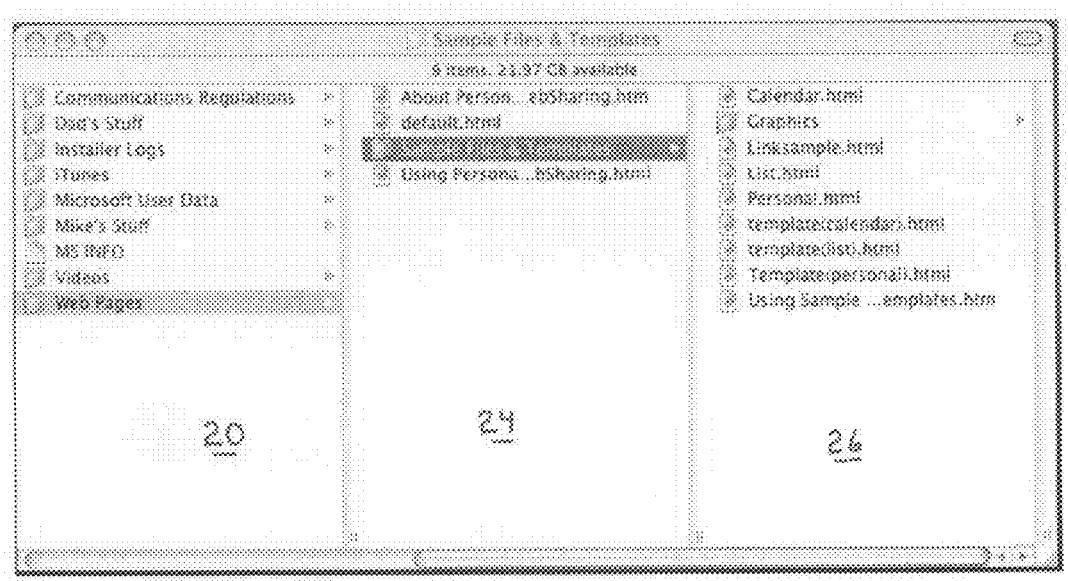
Figure 1E:
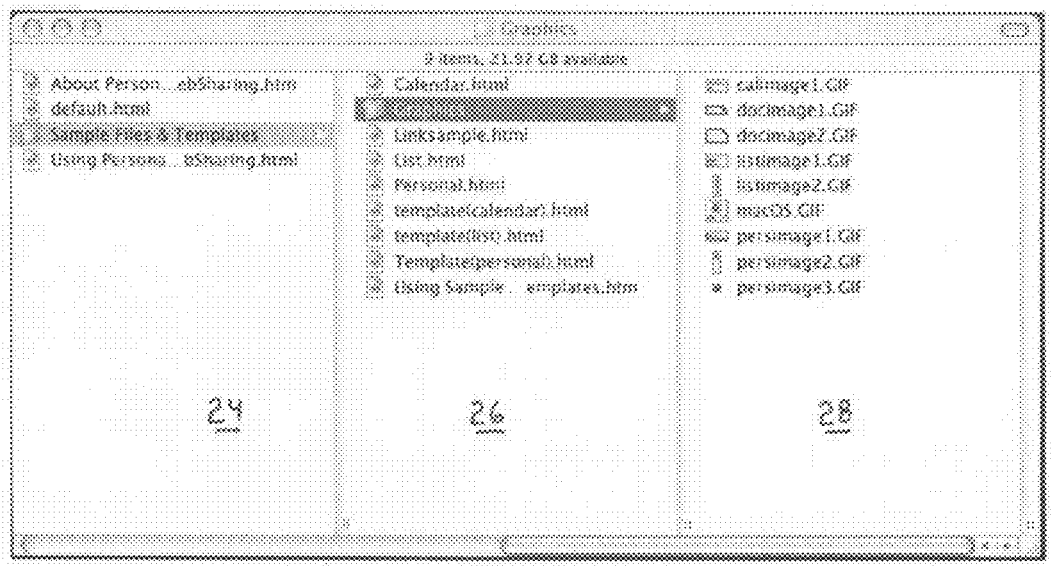
Figure 1F:
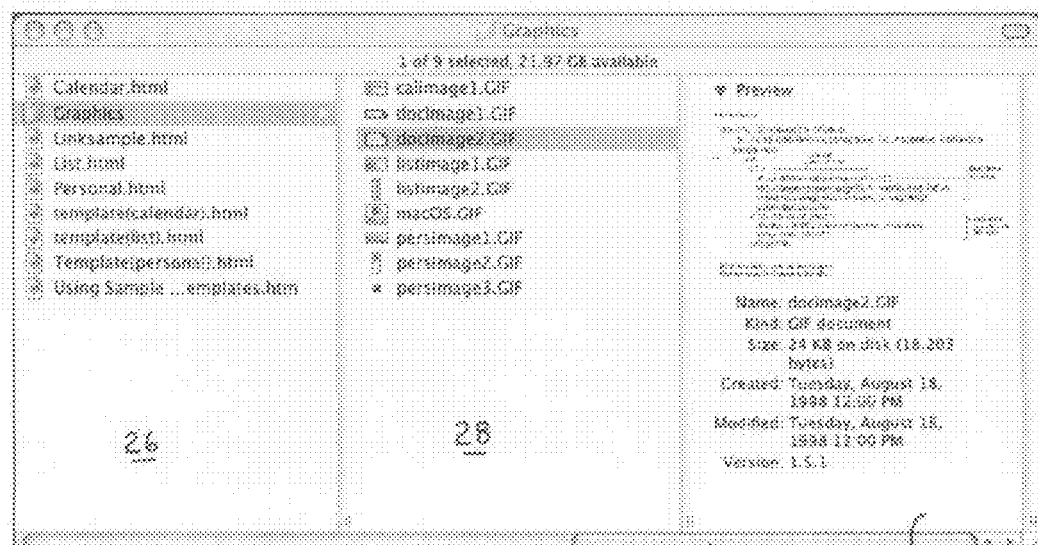
Figure 4A:
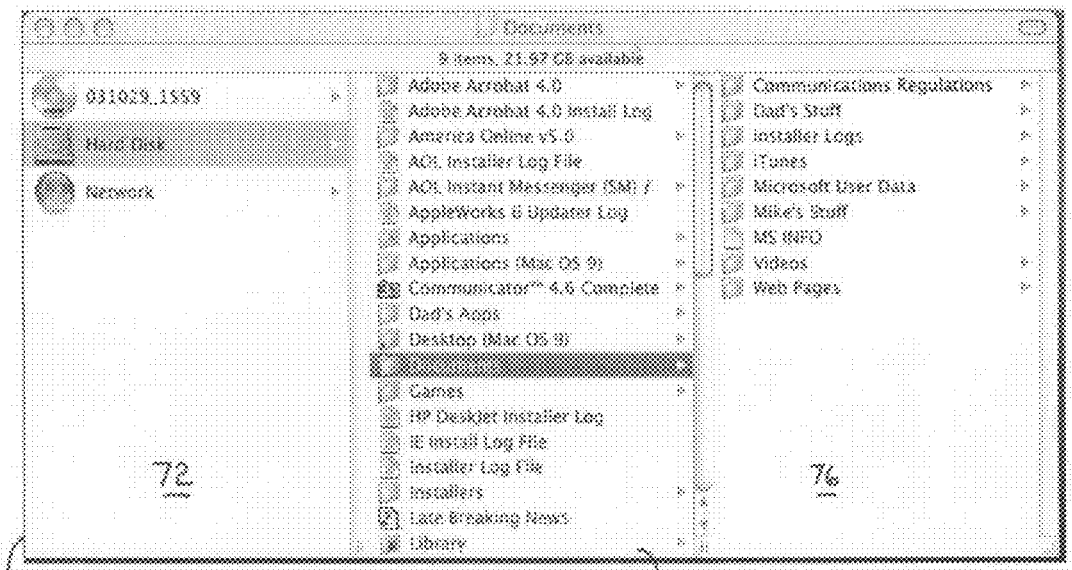
FIGS. 4a-4d illustrate examples of a column view for the file system in accordance with the present invention.
Figure 4B:
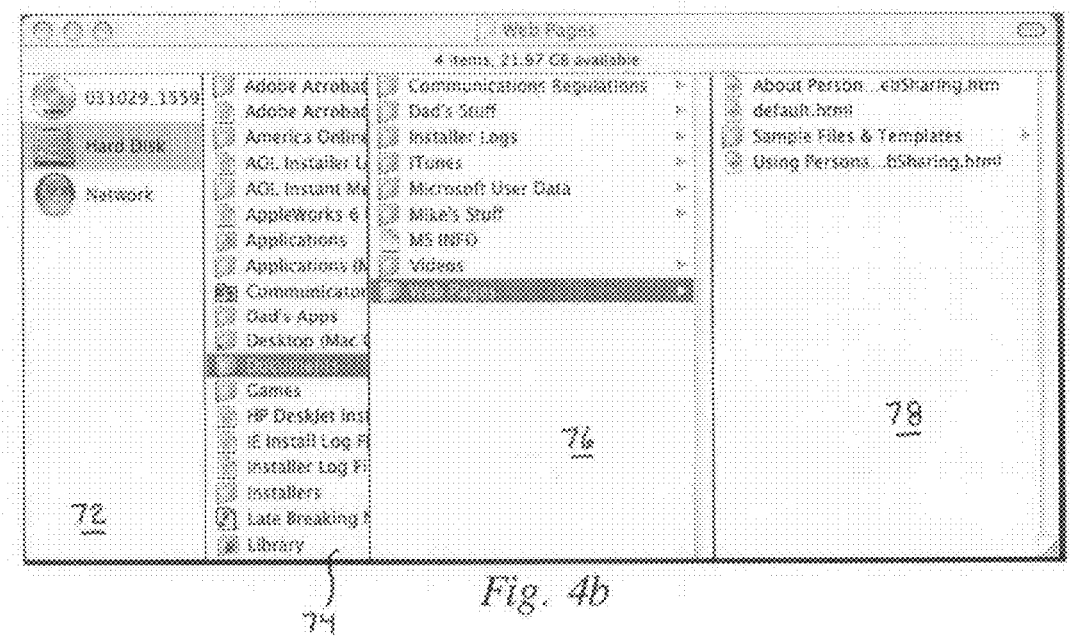

The windows manager 68 controls the display of windows in which data is presented to the user. Such data may be documents generated by application programs 62, or the contents of the file system 58. One embodiment of the present invention is described hereinafter with reference to the window in which the contents of the file system are displayed. An example of such a window 70 is illustrated in FIG. 4a, which corresponds to the view of FIG. 1b. This particular window contains a first column 72 that illustrates the resources at the highest level of the file system, a second column 74 illustrating the first level of files and folders stored in one of those resources, namely the hard disk, and a third column 76 that displays the contents of a selected folder from the second column 74. Referring to FIG. 4b, when the user clicks on one of the folders or files in the third column 76, a fourth column 78 is displayed in the window 70, which contains the contents of the selected folder. Unlike the conventional system illustrated in FIGS. 1a-1f, however, the display of the fourth column does not cause the first column 72 to disappear from view. Rather, as illustrated in FIG. 4b, the columns are arranged so that the first column 72 continues to be displayed, but with a reduced area being allocated to that column. With this arrangement, at least a portion of the first column remains visible.

A number of different techniques can be employed to display the column 72 in a reduced area. In the example of FIG. 4b, the columns are arranged so that column 74 appears to overlap column 72. Similarly, a portion of column 74 is overlapped by column 76. To accomplish this result, the user interface maintains information regarding the original width and content of each of the columns. However, instead of arranging the columns in a conventional side-by-side fashion, some of the columns are positioned in an overlapping manner, with the effective depths of the columns increasing from right to left across the window. In the illustrated example, column 72 is at a greater effective depth than column 74, and column 74 is at a greater depth than column 76, so that column 72 is obscured by column 74 in the area where they overlap, and column 74 is obscured by column 76 in the area where they overlap.

Figure 4C:
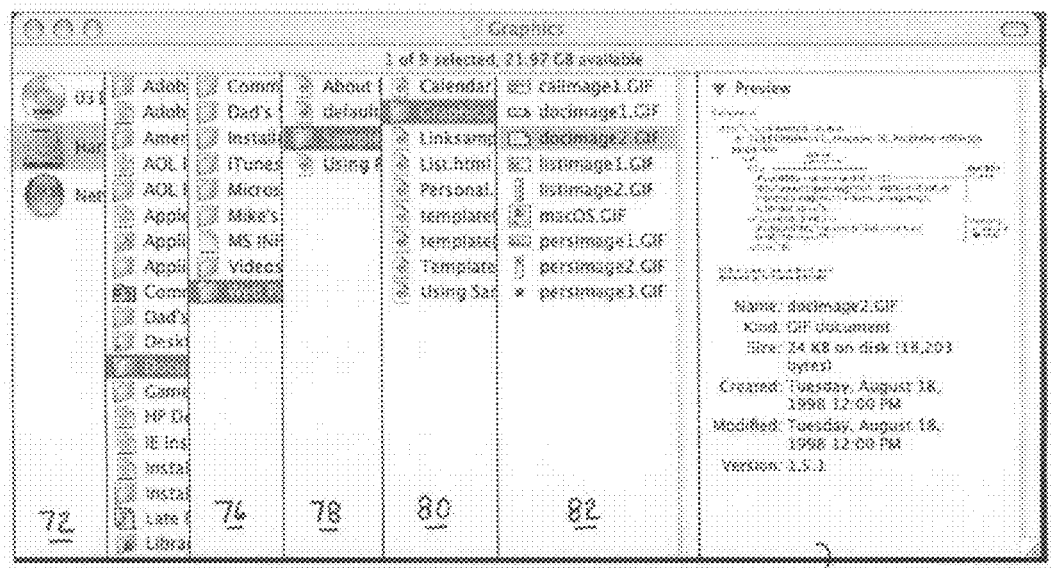

FIG. 4c illustrates the column view after the user has continued to select objects in successive levels of the file system hierarchy, corresponding to the views of FIGS. 1c-1f. As an object in each successive level is selected, another column 78-84 appears on the display, to illustrate the contents of the selected object. As columns are added to the window, the amount of overlap among adjacent columns increases, to accommodate all of the displayed columns within the window 70.

Preferably, two of the columns remain in full view, so that the user can read the entire name of a file or folder. These two columns comprise the focus column, which is the latest column that the user clicked upon, and the contents column, which displays the contents of the file or folder that was clicked upon in the focus column. In the example of FIG. 4c, column 82 is the focus column, and column 84 is the contents column. All of the other columns are displayed in an overlapping manner, which can cause the names of the files or folders to become partially obscured.

Figure 4D:
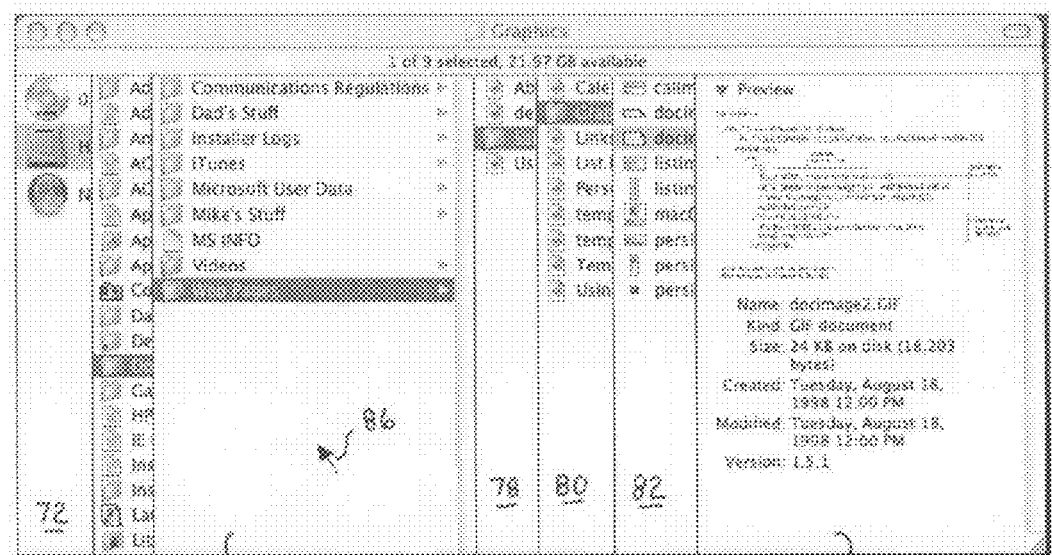

However, enough of each column still remains visible to give the user an overview of the relationship of the levels to one another. If the user desires to see the full name of a file or folder in one of the overlapped columns, the cursor can be positioned over the column containing the object of interest. In response, the column beneath the cursor is displayed at its full width, as illustrated in FIG. 4d. To do so, the graphical user interface calculates new positions for each of the columns, and moves them as required to achieve such a result. More particularly, the area that is occupied by the new focus column over which the cursor 86 resides, i.e., column 76 in the example of FIG. 4d, is first determined, based upon the current position of that column. The available space between this focus column and the content column 84 is then divided among the intervening columns 78, 80 and 82, and a new position is calculated for each of these intervening columns. The columns are then moved horizontally from their original positions to the new, calculated positions, and their effective depths are assigned so that they will appear to be overlapped by the column to the right.

Preferably, this movement is performed in an animated fashion, to create the impression that the columns are shifting out of the way of the focus column. In one embodiment, once their respective positions are determined, each of the intervening columns can be individually shifted across the display using an ease-out/ease-in algorithm of the type described in U.S. application Ser. No. 09/754,147, filed Jan. 5, 2001, the content of which is incorporated herein by reference. The time period over which the movement takes place can be determined in accordance with the length of the path over which the columns must travel. The greater the number of pixels over which the columns must move, the longer the allotted time of travel can be. Of course, other algorithms for determining the rate of movement can be employed as well.

It may be the case that the user has multiple windows open on the display which each contain a column view of objects. For instance, a window might be open for each of the three file system resources 12, 14 and 16. When the cursor is being moved over the active one of these windows, the positions of the columns within that window can shift immediately in response to such movement. However, when the cursor is traversing one of the inactive windows, for example while it is being moved to a menu bar or dock at one edge of the display, it may be disturbing to have the columns in these inactive windows shift with such movement. Accordingly, a delay can be employed to determine whether columns in inactive windows should move in response to cursor position. If the user pauses the cursor over a column of an inactive window for a suitable period of time, e.g. one second, then the columns in that window can shift positions so that the column beneath the cursor becomes the focus column. However, if the cursor is over the column for less than that period of time, no movement takes place.

In the example of FIG. 4d, the focus column is that column over which the cursor is positioned, and the content column remains as the one containing the contents of the most recently selected object. In the example, therefore, the content column is column 84, since it displays information about the file in column 82 that was last selected by the user. It will be appreciated, however, that other combinations of columns could be selected for display at their full width. For instance, if the column 76 becomes the focus column, the adjacent column 78 illustrating the contents of the last object that was previously selected in the focus column could be displayed at full width, instead of the column 84. As another alternative, both columns 78 and 84 could be displayed at full width, in addition to the focus column 76, assuming the window 70 is sufficiently wide to accommodate such a display configuration.

It may be desirable to establish a minimum width for an overlapped column, to enable the user to assess the identity of the objects in the column. For instance, in the examples of FIGS. 4c and 4d, the overlapped columns have a width that permits each object's icon and the first few letters of its title to be visible, which enables the user to still recognize the objects. Of course, when a minimum width is established for overlapped columns, it may not be possible to display every column in the window 70 if the path to a particular object passes through a significant number of levels, e.g. more than ten. In such a case, therefore, a horizontal scroll bar (not shown) can be added to the window 70, to enable the user to view all of the columns. Even in that situation, however, it can be appreciated that the overlapping columns provide the user with a much more comprehensive view of the file system structure than in the full-width views of FIGS. 1a-1f.

In one embodiment, the visible portion of each of the overlapped columns can be the same for each such column. To accomplish this result, the widths of the two full-view columns, i.e. the focus and content columns, are subtracted from the total width of the window, and the remaining width of the window is equally allocated among the other columns for the display of their visible portions. The position of each column is calculated, and the columns are displayed at the corresponding positions.

Figure 5A:
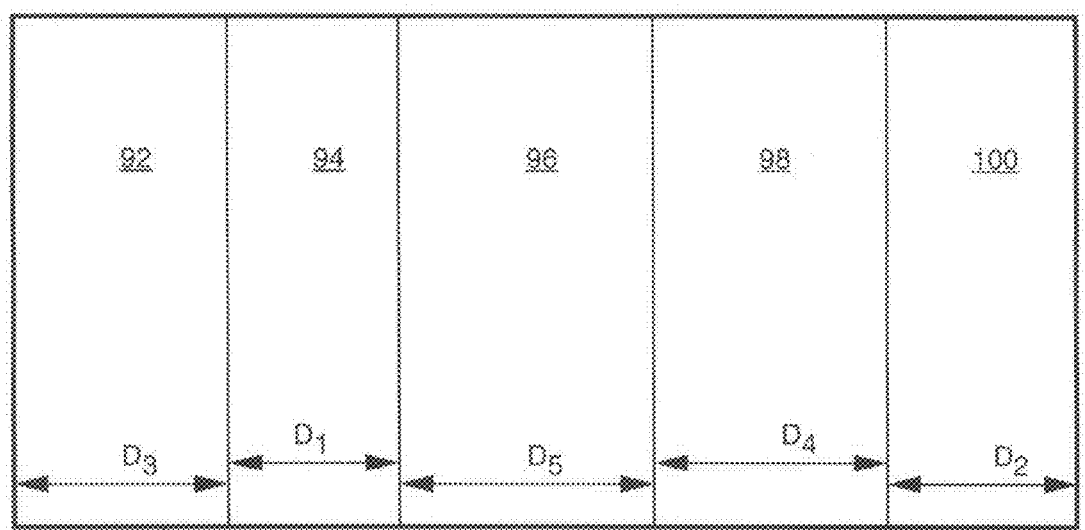
FIGS. 5a-5d schematically depict the adjustment of column widths as a window is resized.
Figure 5B:
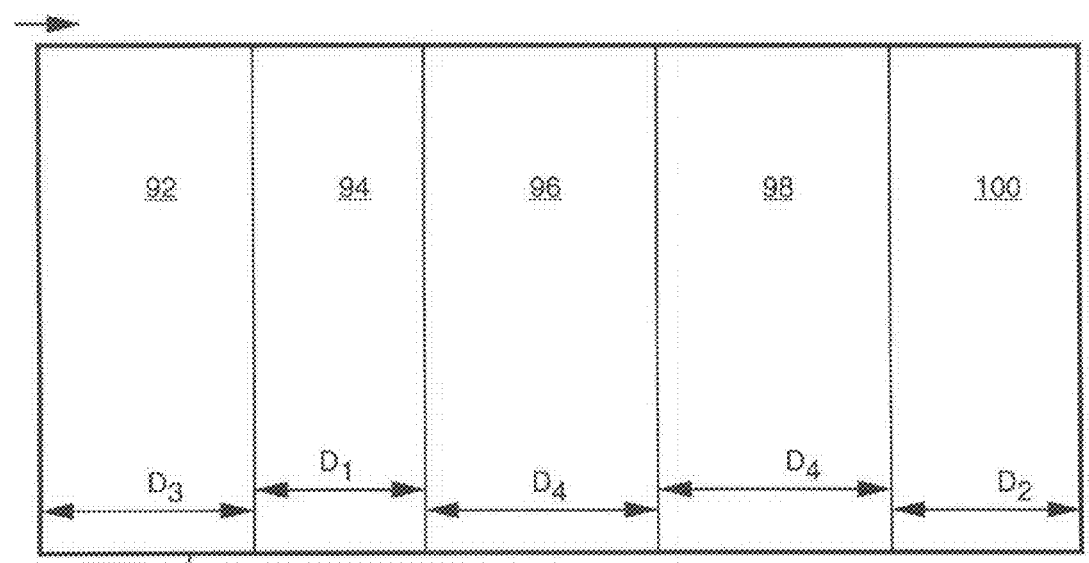
Figure 5C:
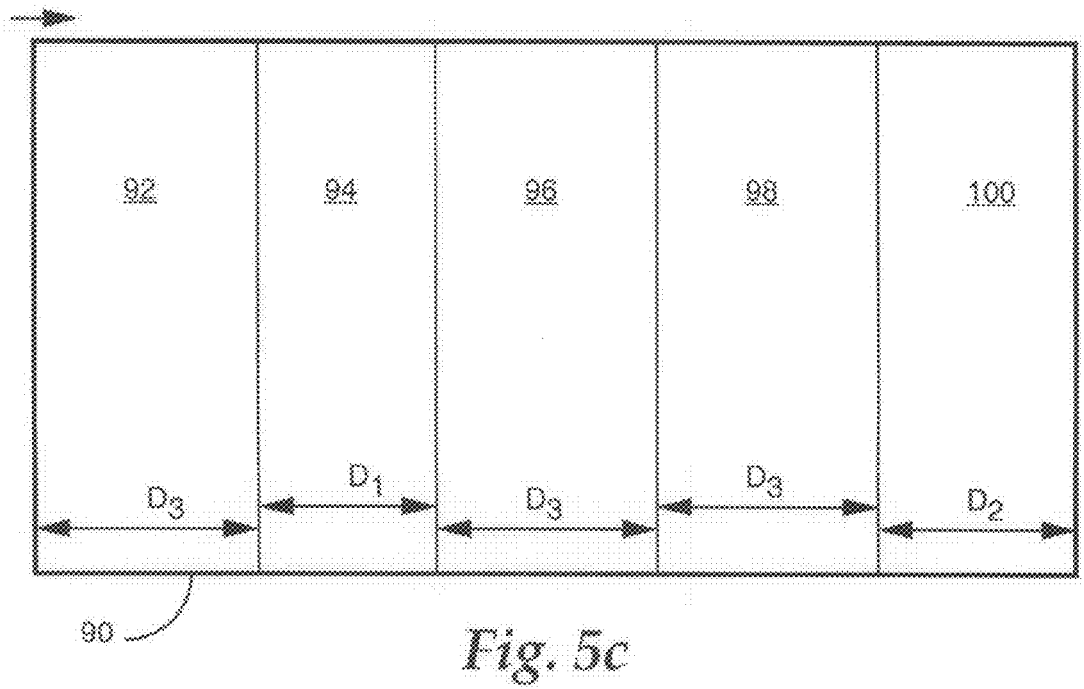
Figure 5D:
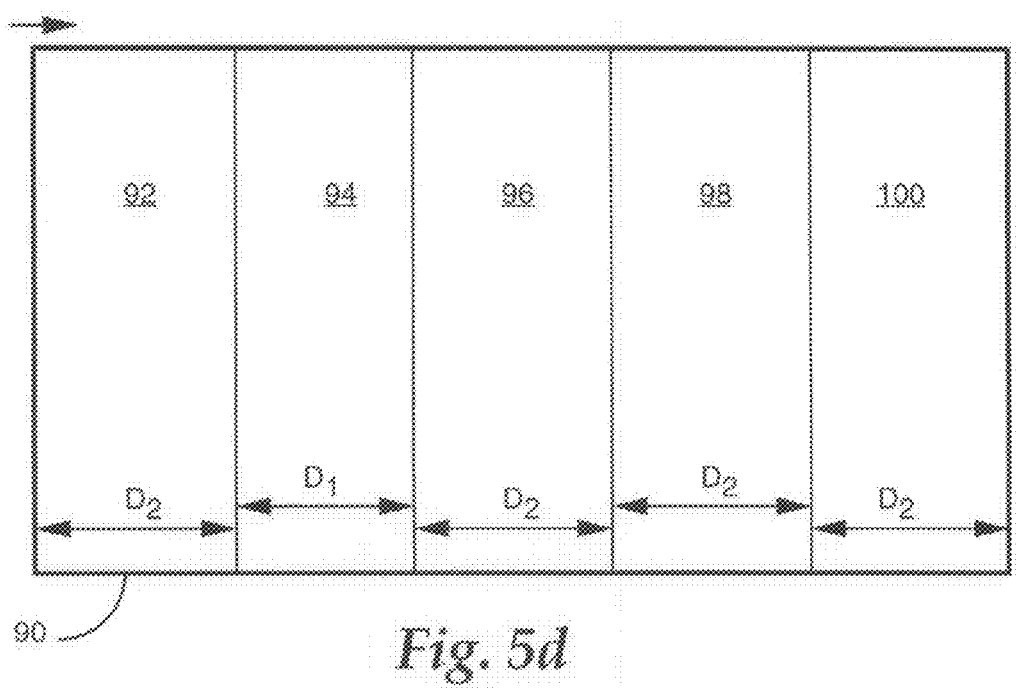

In some cases within this embodiment, however, the visible portions of the overlapped columns could end up being different from one another. This could occur, for instance, if the user manually adjusts the border of one or more of the columns within the window. In this situation, it may be desirable to return the visible portions of the columns to equal widths if the window is resized. The algorithm for determining the sizes of the columns is schematically depicted in FIGS. 5a-5d. These figures illustrate an example of a window 90 containing five columns 92-100. In the initial state of FIG. 5a, the columns have different respective widths $D_1$-$D_5$. If the user resizes the window to decrease its width, the user interface first reduces the visible portion of the column having the widest viewing area, in this case column 96, until the width of its viewing area is the same as that of the visible portion of the column 98 having the next widest viewing area, i.e. $D_4$, as shown in FIG. 5b. At this point, if the user continues to decrease the width of the window 90, the visible portions of both columns 96 and 98 are reduced simultaneously, until they are equal to the width $D_3$ of the visible portion of the next widest column 92, as depicted in FIG. 5c. Further reduction in the width of the window 90 causes the visible portions of all three columns 92, 96 and 98 to be reduced concurrently, until they are equal to the visible width $D_2$ of the next widest column 100, as shown in FIG. 5d. The process continues in this manner as the window is further resized until the visible portions of all of the columns have the same width, at which time they are all reduced by the same amount, until the minimum width is reached. If further resizing of the window 90 occurs beyond this point, a horizontal scroll bar is displayed to enable the user to reposition the columns within the visible area of the window. While not illustrated in the examples of FIGS. 5a-5d, the focus and content columns are displayed at their full widths throughout this process.

In other embodiments of the invention, the overlapped columns may have different respective widths allocated to their visible portions. For instance, it may be preferable to employ a logarithmic or other non-linear variance among the overlapped columns, in accordance with their distance from the focus column. In such an arrangement, the column closest to the focus column can have the widest visible area, the column next to that can have the next widest visible portion, and so on down to the minimum width for the columns farthest away from the focus column.

Figure 6A:
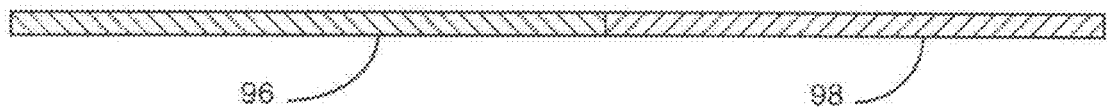
FIGS. 6a-6c illustrate the gradual growth of a shadow as a column is overlapped.
Figure 6B:
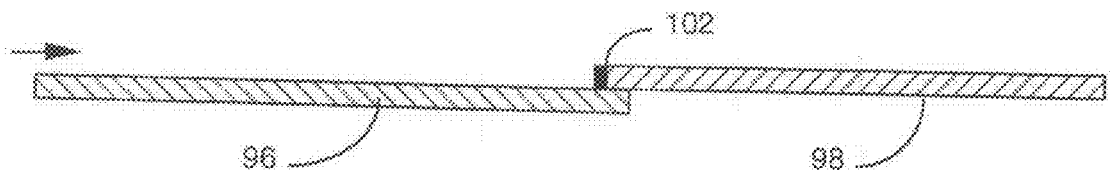
Figure 6C:
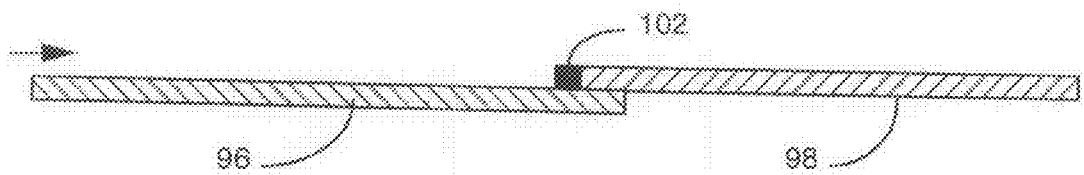

To reinforce the impression that the columns overlap one another, it is preferable to display a shadow along the vertical interface of two overlapping columns. For example, a typical shadow might have a width of about five pixels. However, if such a shadow suddenly pops into view at the instant two columns begin to overlap, the effect could be disturbing to the user. In accordance with another feature of the invention, therefore, the width of the shadow gradually grows from the edge of the overlapping column as the visible portion of the adjacent column is reduced. To illustrate, FIG. 6 is an edge view of two adjacent columns 96 and 98, corresponding to the initial state of FIG. 5a. As the column 96 begins to be overlapped, a narrow shadow appears along the left edge of window 98. For instance, as shown in FIG. 6b, as the visible portion of column 96 is reduced by two pixels, a shadow 102 having a width of one pixel is displayed. This shadow might be comprised of a line of black or grey pixels having a suitable transparency value, e.g. 40-60%, so that they only partially obscure the underlying column 96. As the column 96 is further overlapped by another two pixels, the shadow can grow by the width of another pixel, as shown in FIG. 6c. The growth of the shadow in this manner can continue until it reaches its full desired width, e.g. 5 pixels.

The foregoing example of the adjustment of a column's visible width is described in the context of resizing a window. The same approach can be employed when columns are added to a window, for example as the user clicks upon objects at successive levels of the file system hierarchy. The same type of animation is preferably employed when a new column is added to the window. Thus, with reference to FIGS. 4a and 4b, when the user clicks on an object in column 76, the new column 78 slides into view. In this particular example, the new column slides in from the right side of the window, and the column 76 slides to the left into its overlapping arrangement with column 74. At the same time, column 74 slides into its overlapping arrangement with column 72. As each additional column is added, the columns slide further to the left, to increase the amount of overlap correspondingly. The same techniques can be employed in other implementations where columns might be added from the left side of the window, or inserted into the middle of the window between existing columns. Likewise, it is equally applicable to containers that are vertically stacked, rather than horizontally arranged.

The examples of FIGS. 4-6 are presented with reference to a column view, in which each column corresponds to a level of a hierarchy. The applicability of the invention is not limited to this particular type of viewer, however. For instance, FIG. 7 illustrates a list view of objects, which might be employed with a collection of objects that need not have a hierarchical or other structured relationship to one another. In this view, the left field 104 lists the objects of interest, e.g. objects in a folder. Successive fields 106-110 list attributes of each object, such as its parent object, date modified and kind of object. To enable all of the attributes of an object to be assessed by the user, the attribute lists can be displayed in an overlapping fashion, in the same manner as the columns of FIGS. 4b and 4c. Similarly, the sliding of the lists can occur in response to movement of the cursor over the different fields, to enable the user to obtain a full view of a particular attribute of interest.

Figure 8A:
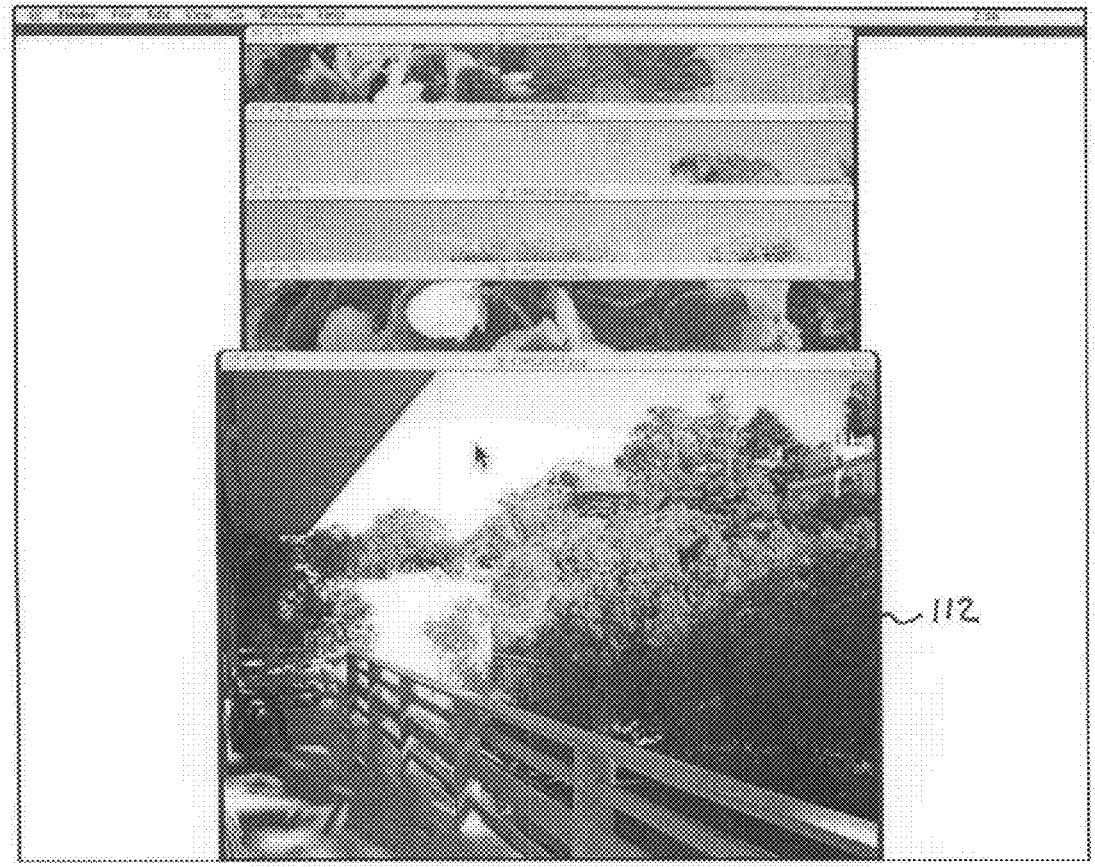
FIGS. 8a-8c illustrate examples of the application of the present invention to windows.
Figure 8B:
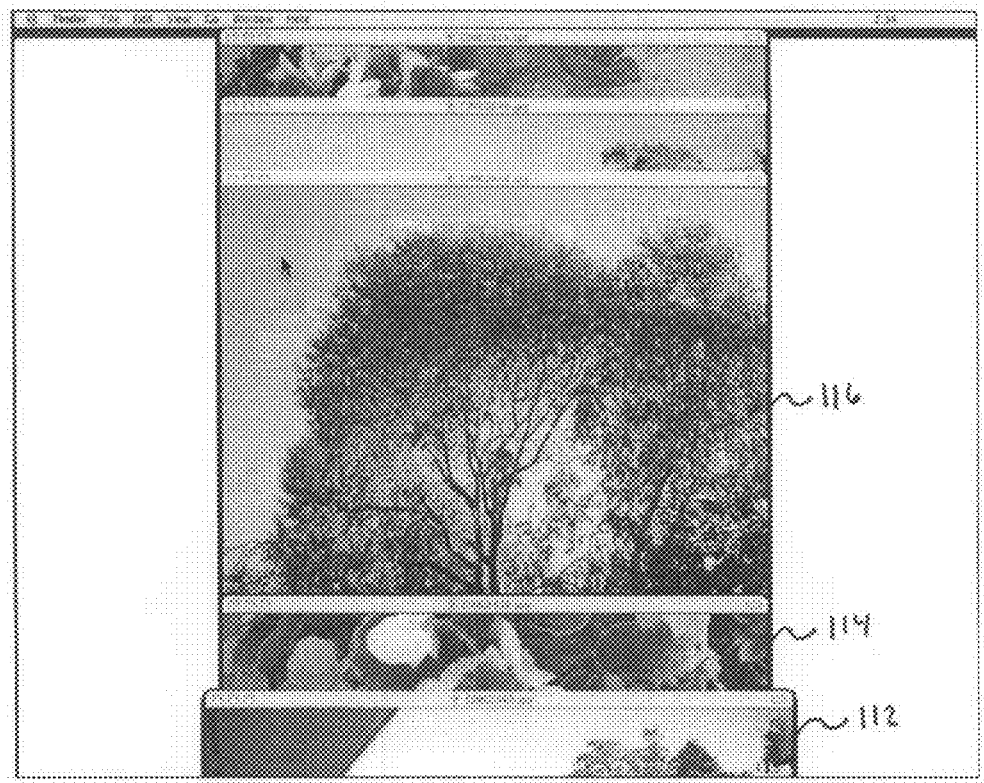

The ability to slide overlapping containers, to enable the user to navigate among them and see them in full view, is useful in other contexts as well. For instance, it can be utilized in connection with overlapping windows. FIG. 8a illustrates a sequence of overlapping windows that are arrayed in a vertical direction. In this view, the lowest window 112 is the active window, and is displayed in full view. As the user moves the cursor upwardly, the windows slide vertically, to enable the particular window over which the cursor is currently positioned to come into full view. Thus, as can be seen in FIG. 8b, the user has moved the cursor up, to position it over the center window 116. In response to this movement, the lowest window 112 and the intervening window 114 have slid downwardly, to enable the window 116 to be displayed in full view. The sliding of the windows preferably takes place in an animated fashion, in accordance with a movement algorithm such as the one referenced previously.

Figure 8C:
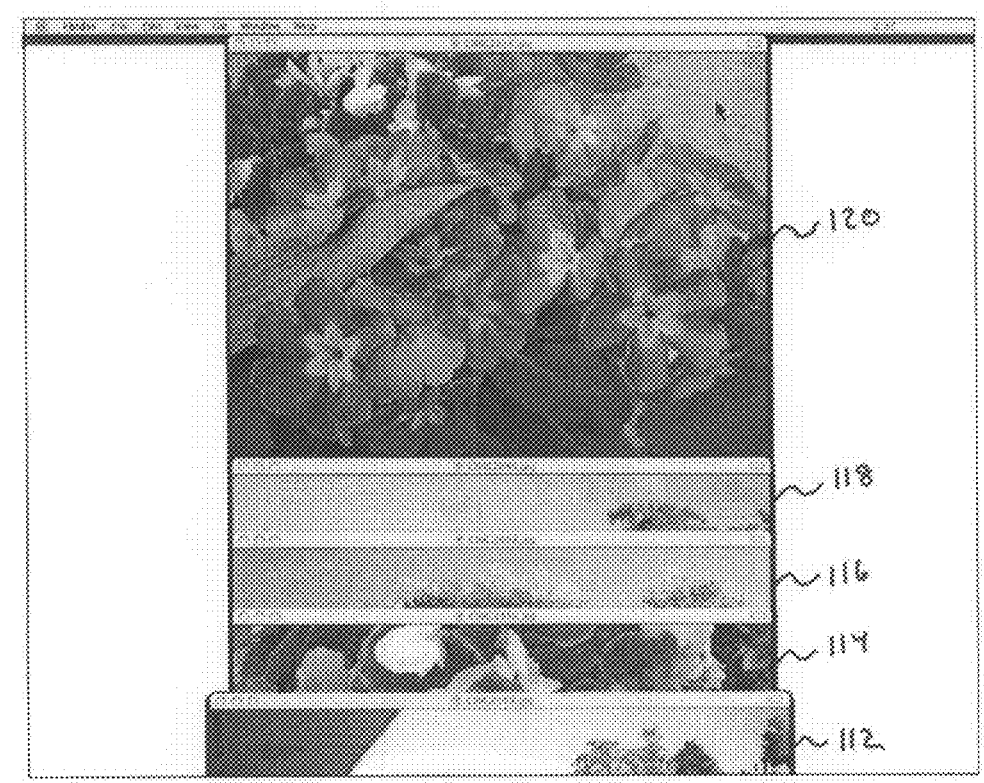

Further movement of the cursor in an upward direction can cause additional windows to slide downwardly on the display. FIG. 8c illustrates the result when the user has moved the cursor to the top window 120. In this case, each of the windows 116 and 118 has also slid downwardly, to enable the window 120 to be displayed in full view.

The mechanism to achieve this feature is the same as that described previously in connection with the sliding columns. More particularly, since the user interface, and more specifically the windows manager 68, maintains information regarding the size and position of each open window in the display, it can readily determine the area occupied by any window over which the cursor is positioned, i.e. the focus window. Once this area has been determined, the remaining area of the display is allocated to the other windows that overlap the focus window, either equally or with variance among them. In the case of FIG. 8b, the vertical distance below the window 116 is divided in two, and the windows 112 and 114 are positioned accordingly. When the cursor is moved to the position of FIG. 8c, the vertical dimension below the window 120 is divided into fourths, and the windows 112-118 slide to the corresponding positions. If any windows are located to the right or left of the focus window, the same procedure is employed to move them horizontally out of the way of the focus window.

The sliding of windows and other containers in this manner to enable the user to obtain a full view of any one of them is advantageous, in that it avoids the need to click on each individual window to bring it to the foreground of the display, which could result in another window being completely hidden behind the one that was clicked upon, and therefore inaccessible. It also avoids the need to minimize windows that overlap a window of interest, which results in a change in the configuration of the displayed windows. With the present invention, the currently active window, e.g. window 112 in the example of FIGS. 8a-8c, can remain the active window, even as the user moves the cursor around the display area to obtain a full view of other windows. If the user locates another window he desires to work within, he can click in that window to make it the active one. If the user moves the cursor off the focus window, e.g. slides the cursor to the right in the view of FIG. 8c, the windows can remain in their current states. Thus, window 120 remains in full view, even though window 112 may be the active window.

The application of this navigation technique to other types of containers can be envisioned as well. For instance, the pages of a document can be displayed in a stacked arrangement. By moving the cursor over the visible edges of the pages, the user can bring any desired page into full view, with the preceding pages moving out of its way. Another application is text chat boxes associated with instant messaging types of programs. If a user is conducting several conversations at once, such that the boxes overlap one another, it is possible to readily observe any given one of them by simply moving the cursor to the box associated with that chat session. As another example, different workspaces can be brought into view on a display by moving the cursor so that one workspace slides out of view while another moves onto the screen. Similarly, if the user opens multiple web pages within a browser, the cursor can be used to select among the pages within a single browser window, rather than require a separate window for each page.

The implementation of this technique is not limited to movement of the cursor. Rather, it can be employed with any type of user input device that enables the user to direct focus to different containers. For example, some graphical user interfaces enable the user to switch among open windows by means of the keyboard, e.g. actuation of the "Tab" key. As another example, some types of devices employ a scroll wheel to move from one information container to another. Regardless of the mechanism employed to identify a given container, the present invention can be employed to bring that container into full view.

Furthermore, the applicability of this feature of the invention is not limited to user input to select a container. In some situations, system-generated events could cause a particular container to be displayed in full view. For instance, in the context of the text chat application described previously, if a new message is received in one of the open chat boxes, any boxes that overlap that box can move out of its area, to enable the user to read the incoming message. As another example, in a file system view, if a new file is added to a server, the focus can automatically switch to the column associated with the level at which the file was added.

The foregoing examples have been presented with reference to one embodiment of the invention, in which the reduced area for the visible portion of a container is obtained by overlapping adjacent containers. Other techniques can be employed as well to achieve the same general results. For instance, rather than overlapping columns or windows, it is possible to scale the containers to fit into the allocated area. In the case of columns, therefore, the actual width of the column is scaled back to the size of the allocated area. In this situation, the entire contents of the column remain visible, but in a horizontally compressed form.

Figure 9A:
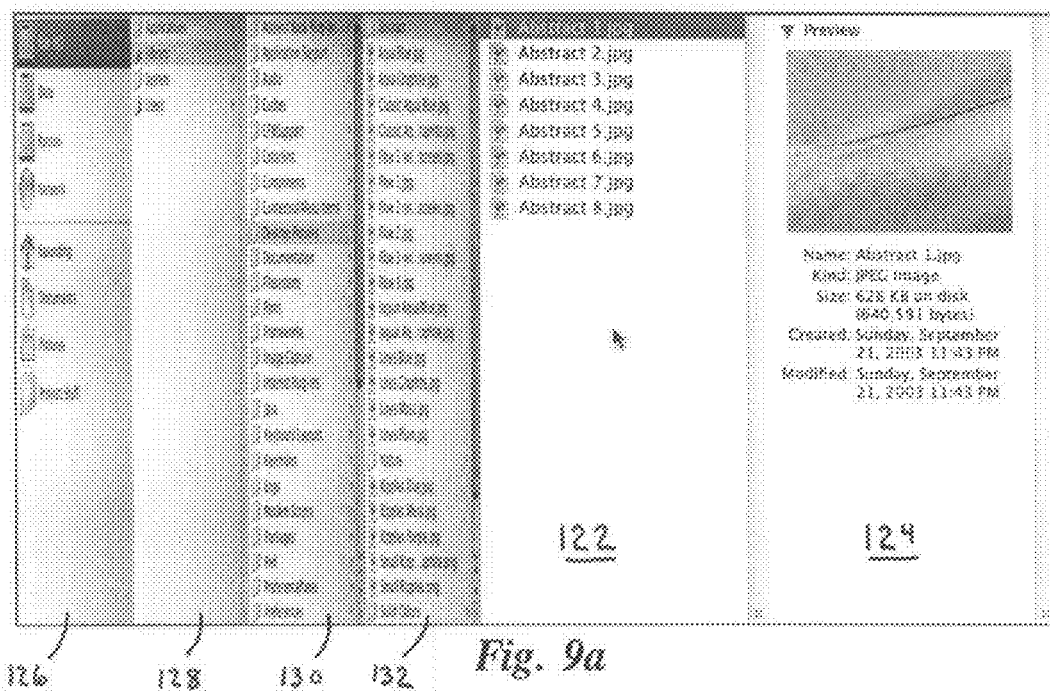
FIGS. 9a and 9b illustrate an implementation of the invention in which columns are rotated out of the plane of the display.
Figure 9B:
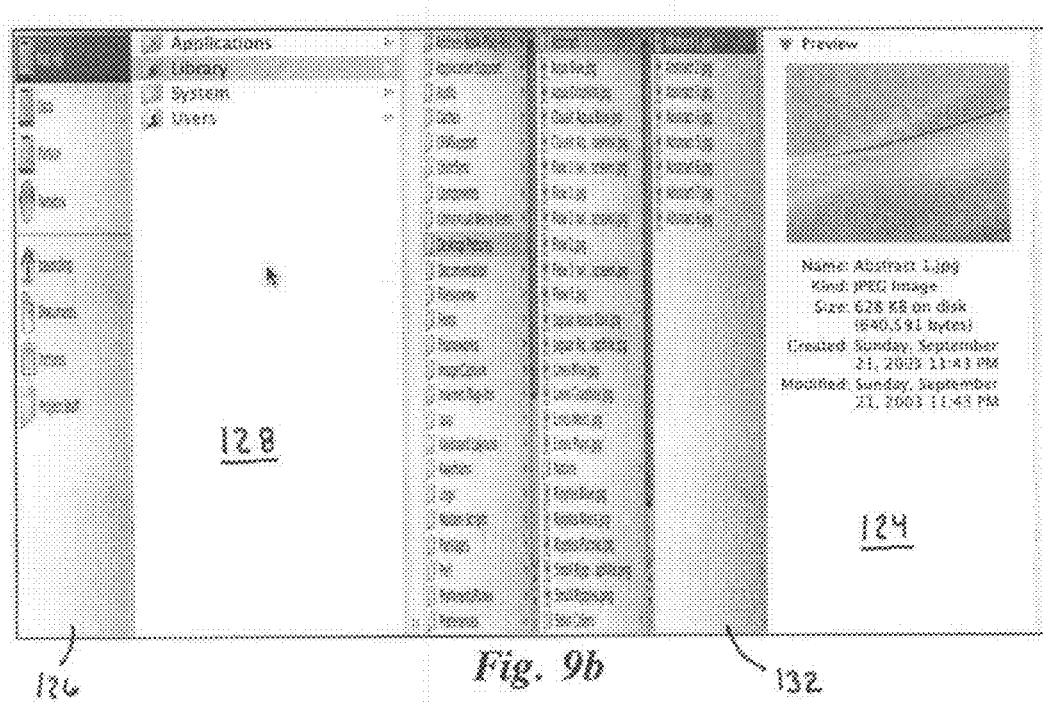

In another variation, a three-dimensional animation can be applied to the containers, which causes them to appear to swing out of the plane of the display. The result is analogous to the effect of leafing through the pages of a book or scanning through folders in a file drawer. FIGS. 9a and 9b illustrate examples of such an effect. In FIG. 9a, column 122 is the focus column and column 124 is the content column. The reducing viewing area of the other columns 126-132 is achieved by horizontally compressing each column and adding shading so that it appears that the right edges of the columns are at a greater depth than their left edges. The impression created by this effect is that the columns 126-132 have pivoted about their left edges towards the back of the display.

FIG. 9b illustrates the result when the cursor has moved over a new focus column 128. In the animation to create this effect, the new focus column "swings" forward by increasing its width and removing the shading. At the same time, the previous focus column 122 "swings" back by reducing its width and adding appropriate shading, and the intermediate columns 130 and 132 slide to the right. This type of animation is particularly appropriate for the example described previously, in which the pages of a document are displayed in a stacked arrangement. As the user moves the cursor over the visible edges of the pages, overlapping pages can flip out of the way of the page being viewed, to provide a realistic effect.

From the foregoing, it can be seen that the present invention provides a user interface that enables the user to obtain a comprehensive view of multiple items of information that are located in different respective containers. As a result, the user is not required to actively select different containers or scroll across significant distances if a large number of containers are being displayed.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for displaying information in a graphic user interface of a computer system, said method comprising:
   causing the computer system to display a plurality of containers of information, wherein:
      a first container of the plurality of containers of information is a content container and displayed in full view,
      a second container of the plurality of containers of information is a focus container and displayed in full view, and
      the remaining containers of information are displayed in a first overlapping arrangement such that a plurality of the remaining containers of information are only partially visible due to the first overlapping arrangement;
   causing the computer to detect an event that selects a third container from the remaining containers of information; and
   causing the computer system to reposition the containers of information, excluding said content container, based on said detection, wherein said repositioning includes moving and displacing one or more of the unselected containers of information such that the third container of information is displayed in full view and the unselected containers of information, including said second container are displayed in a second overlapping arrangement such that a plurality of the unselected containers of information are only partially visible due to the second overlapping arrangement and the content container remains visible in full view, and wherein said third container of information becomes the focus container in response to the event.

2. The method of claim 1, wherein said containers are columns in a window.

3. The method of claim 1, wherein said containers are windows.

4. The method of claim 1, wherein said repositioning includes, displaying an animation of the unselected containers sliding to respective destination positions.

5. The method of claim 4, wherein the unselected containers slide within a single dimension of movement.

6. The method of claim 4, wherein displaying the animation comprises:
   determining the area occupied by said third container;
   determining an area available for the unselected containers;
   determining the respective destination positions for the unselected containers in the available area; and
   moving said displaced containers to the respective destination positions.

7. The method of claim 1, wherein said event is associated with a user input action to shift focus to said third container.

8. The method of claim 7, wherein said user input action is movement of a cursor to a position over said third container.

9. The method of claim 8, including causing the computer system to inhibit said repositioning of the unselected containers until said cursor remains over said third container for a predetermined period of time.

10. The method of claim 1, wherein said event is generated by the computer system.

11. The method of claim 1, including causing the computer system to display shadows at overlapping portions of said unselected containers.

12. The method of claim 11, wherein the widths of said shadows are proportional to the amount of overlap between containers.

13. A non-transient computer-readable medium having encoded thereon a graphic user interface for a computer system that, when executed by a processor, causes the computer system to:
   display a plurality of containers, wherein:
      a first container of the plurality of containers of information is a content container and displayed in full view;
      a first container of the plurality of containers of information is a focus container and displayed in full view, and
      the remaining containers of information are displayed in a first overlapping arrangement such that a plurality of the remaining containers of information are only partially visible due to the first overlapping arrangement;
   detect an event that selects a third container from the other containers in the stack; and
   reposition the containers of information, excluding said content container, based on said detection, wherein said repositioning includes moving and displacing one or more of the unselected containers of information such that the third container of information is displayed in full-view and the unselected containers of information, including said second container, are displayed in a second overlapping arrangement such that a plurality of the unselected containers of information are only partially visible due to the second overlapping arrangement and the content container remains visible in full view, and wherein said third container of information becomes the focus container in response to the event.

14. The computer-readable medium of claim 13, wherein said containers are columns in a window.

15. The computer-readable medium of claim 13, wherein said containers are windows.

16. The computer-readable medium of claim 13, wherein the graphic user interface causes the computer system to display an animation of the unselected containers sliding to respective destination positions.

17. The computer-readable medium of claim 16, wherein the unselected containers slide within a single dimension of movement.

18. The computer-readable medium of claim 16, wherein the graphic user interface causes the computer system to:
   determine the area occupied by said third container;
   determine an area available for the unselected containers;
   determine the respective destination positions for the unselected containers in the available area; and
   move said displaced containers to the respective destination positions.

19. The computer-readable medium of claim 18, wherein the graphic user interface causes the computer system to inhibit said repositioning of the unselected containers until said cursor remains over said third container for a predetermined period of time.

20. The computer-readable medium of claim 13, wherein said event is associated with a user input action to shift focus to said third container.

21. The computer-readable medium of claim 20, wherein said user input action is movement of a cursor to a position over said third container.

22. The computer-readable medium of claim 13, wherein said event is generated by the computer system.

23. The computer-readable medium of claim 13, wherein the graphic user interface causes the computer system to display shadows at the overlapping portions of said unselected containers.

24. The computer-readable medium of claim 23, wherein the widths of said shadows are proportional to an amount of overlap between containers.

25. A computer system, comprising:
a display device;
a processor; and
a memory device having program instructions for a graphic user interface stored thereon, said program instructions, when executed by the processor configuring the computer system to:
  display a plurality of containers, wherein:
    a first container of the plurality of containers of information is a content container and displayed in full view,
    a second container of the plurality of containers of information is a focus container and displayed in full view, and
    the remaining containers of information are displayed in a first overlapping arrangement such that a plurality of the remaining containers of information are only partially visible due to the first overlapping arrangement;
  detect an event that selects a third container from the other containers in the stack; and
  reposition the containers of information, excluding said content container, based on said detection, wherein said repositioning includes moving and displacing one or more of the unselected containers of information such that the third container of information is displayed in full-view and the unselected containers of information, including said second container, are displayed in a second overlapping arrangement such that a plurality of the unselected containers of information are only partially visible due to the second overlapping arrangement and the content container remains visible in full view, and wherein said third container of information becomes the focus container in response to the event.

26. The computer system of claim 25, wherein said containers are columns in a window.

27. The computer system of claim 25, wherein said containers are windows.

28. The computer system of claim 25, wherein said program instructions configure the computers system to display an animation of the unselected containers sliding to respective destination positions.

29. The computer system of claim 28, wherein the unselected containers slide within a single dimension of movement on the display.

30. The computer system of claim 28, wherein said program instructions configure the computer system to:
  determine the area occupied by said third container;
  determine an area available for the unselected containers;
  determine the respective destination positions for the unselected containers in the available area; and
  move said displaced containers to the respective destination positions.

31. The computer system of claim 30, wherein said program instructions configure the computer system to inhibit said repositioning of the unselected containers until said cursor remains over said third container for a predetermined period of time.

32. The computer system of claim 25, wherein said event is associated with a user input action to shift focus to said third container.

33. The computer system of claim 32, wherein said user input action is movement of a cursor to a position over said third container.

34. The computer system of claim 25, wherein said event is generated by the computer system.

35. The computer system of claim 25, wherein said program instructions configure the computer system to display shadows at overlapping portions of said unselected containers.

36. The computer system of claim 35, wherein the widths of said shadows are proportional to the amount of overlap between containers.

* * * * *